United States Patent
Zielinski et al.

(10) Patent No.: US 8,476,396 B2
(45) Date of Patent: Jul. 2, 2013

(54) ALLOPHANATE MODIFIED POLYISOCYANATES

(75) Inventors: David P. Zielinski, Wexford, PA (US); Myron Shaffer, New Cumberland, WV (US); Michael K. Jeffries, Follansbee, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 441 days.

(21) Appl. No.: 11/807,156

(22) Filed: May 25, 2007

(65) Prior Publication Data

US 2007/0243334 A1 Oct. 18, 2007

Related U.S. Application Data

(62) Division of application No. 11/096,403, filed on Mar. 31, 2005, now abandoned.

(51) Int. Cl.
*C08G 18/78* (2006.01)
*C08G 18/77* (2006.01)
*C08G 18/73* (2006.01)
*C08G 18/10* (2006.01)

(52) U.S. Cl.
USPC .......... 528/59; 528/60; 528/61; 528/65; 528/66; 528/76; 528/80; 528/85

(58) Field of Classification Search
USPC .......... 528/59, 60, 61, 65, 66, 76, 80, 85
See application file for complete search history.

(56) References Cited

U.S. PATENT DOCUMENTS

| | | | | |
|---|---|---|---|---|
| 5,124,427 A * | 6/1992 | Potter et al. | ...... | 528/67 |
| 5,208,334 A * | 5/1993 | Potter et al. | ...... | 544/193 |
| 5,235,018 A * | 8/1993 | Potter et al. | ...... | 528/49 |
| 5,767,220 A * | 6/1998 | Venham et al. | ...... | 528/49 |
| 6,111,053 A * | 8/2000 | Brahm et al. | ...... | 528/75 |
| 6,392,001 B1 * | 5/2002 | Mertes et al. | ...... | 528/59 |
| 6,410,095 B1 * | 6/2002 | Brahm et al. | ...... | 427/385.5 |
| 6,613,389 B2 | 9/2003 | Li et al. | ...... | 427/388.1 |
| 6,733,838 B2 | 5/2004 | Brady, Jr. | ...... | 427/385.5 |
| 2004/0210028 A1 | 10/2004 | Slack et al. | ...... | 528/76 |

FOREIGN PATENT DOCUMENTS

| | | |
|---|---|---|
| EP | 0 649 866 A1 | 4/1995 |
| EP | 649866 A1 * | 4/1995 |
| EP | 0 899 283 A2 | 3/1999 |
| EP | 1 217 021 A1 | 6/2002 |

OTHER PUBLICATIONS

Morrison et al.; Organic Chemistry, Third Edition; Allyn and Bacon, Inc.; Boston; 1973; p. 318.*

* cited by examiner

*Primary Examiner* — Rabon Sergent
(74) *Attorney, Agent, or Firm* — Robert S. Klemz

(57) ABSTRACT

A composition that includes isocyanate group containing compounds that include on average i) a NCO functionality less than or equal to 3.5; and ii) from 1.5 to 8 percent by weight, based on the isocyanate containing compound, of allophanate groups; and which is substantially free of uretdione groups. The composition can be used in two component elastomeric coating compositions that include a component A the above-described composition and a component B that includes a compound containing one or more functional groups that are reactive with isocyanate groups. The elastomeric coating compositions can be used to coat substrates.

19 Claims, No Drawings

ALLOPHANATE MODIFIED POLYISOCYANATES

CROSS REFERENCE TO RELATED PATENT APPLICATION

The present application is a divisional application which is entitled to the right of priority under 35 U.S.C. 121 of U.S application Ser. No. 11/096,403, filed Mar. 31,2005, abandoned.

BACKGROUND OF THE INVENTION

1. Field of the Invention

The present invention is directed to polyisocyanates and in particular to polyisocyanates useful in elastomeric coatings.

2. Description of the Prior Art

Elastomeric coating compositions are often used to form a protective coating on a substrate. In many cases, the composition forms a protective coating on roofs, or a substrate provided by one or more components of an automotive vehicle.

U.S. Pat. No. 6,613,389 discloses elastomeric coating compositions that include at least two components, a polyisocyanate component; and an amine component.

U.S. Pat. No. 6,733,838 discloses fluorinated polyurethane elastomer coatings prepared by the reaction of a polyol in a base component with a polyisocyanate in the curing agent.

Many elastomeric coatings utilize aliphatic polyisocyanates containing uretdione groups with low NCO functionality because of their desirably low viscosity. However, the uretdione structure can be prone to scission under high temperatures or aging, reforming monomeric isocyanates and liberating carbon dioxide. This causes many problems within the coating, including blistering and lower tensile strength.

There is therefore a need in the art for elastomeric coating compositions that do not degrade when exposed to high temperatures and/or aging.

SUMMARY OF THE INVENTION

The present invention is directed to a composition that includes isocyanate group containing compounds that include on average
  i) a NCO functionality less than or equal to 3.5; and
  ii) from 1.5 to 8 percent by weight, based on the isocyanate containing compound, of allophanate groups; and which is substantially free of uretdione groups.

The present invention also provides a two component elastomeric coating composition that includes
  a component A containing isocyanate group containing compounds containing on average
    i) a mean NCO functionality less than or equal to 3.5; and
    ii) from 1.5 to 8 percent by weight, based on the isocyanate containing compound, of allophanate groups; and which is substantially free of uretdione groups; and
  a component B that includes a compound containing one or more functional groups that are reactive with isocyanate groups.

The present invention also provides a process for coating a substrate that includes a) providing a surface of a substrate and b) contacting the surface with the above-described two component elastomeric coating composition.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

In the present invention it has been found that elastomeric coating compositions that do not degrade when exposed to high temperatures and/or aging can be obtained by modifying aliphatic polyisocyanates through allophanatization. The modification provides that the functionality of the polyisocyanate can be reduced using a more thermally stable structure. An added benefit to this modification is an improvement in tensile strength and percent elongation of the elastomeric coating formulated with the present allophanate modified polyisocyanates compared to a uretdione modified polyisocyanate.

The present invention provides a composition that contains isocyanate group containing compounds that include on average
  i) a NCO functionality less than or equal to 3.5; and
  ii) from 1.5 to 8 percent by weight, based on the isocyanate containing compound, of allophanate groups; and which is substantially free of uretdione groups.

As used herein, the term "substantially free" is meant to indicate that a material or functional group can be present in an incidental amounts or that a particular occurrence or reaction only takes place to an insignificant extent, which does not effect desired properties. In other words, the material or functional group is not intentionally added to an indicated composition, but may be present at minor or inconsequential levels, for example, because it was carried over as an impurity as part of an intended composition component.

In an embodiment of the invention, the isocyanate group containing compounds contain one or more structural units conforming to the following formula

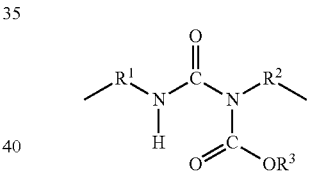

where
  $R^1$ is selected from the group consisting of a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms, and a divalent aromatic hydrocarbon group having 6 to 15 carbon atoms, wherein $R^1$ can optionally include from 1 to 3 NCO groups;
  $R^2$ is selected from the group consisting of a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms, and a divalent aromatic hydrocarbon group having 6 to 15 carbon atoms, wherein $R^2$ can optionally include from 1 to 3 NCO groups; and
  $R^3$ is selected from the group consisting of a $C_1$ to $C_{32}$ linear, branched or cyclic aliphatic, cycloaliphatic, araliphatic, or aromatic hydrocarbon group, a —CH3 terminated polyether, a polyester, and a polyurethane.

In a particular embodiment of the invention, $R^1$ can be a divalent aliphatic hydrocarbon group having from 4 to 12 carbon atoms, $R^2$ can be a divalent aliphatic hydrocarbon group having from 4 to 12 carbon atoms, and $R^3$ can be a $C_1$-$C_{12}$ linear or branched aliphatic hydrocarbon.

In another embodiment of the invention, the composition that contains isocyanate group containing compounds has a bulk viscosity of at least 1, in some cases at least 10, and in other cases at least 25 cps and the viscosity can be up to 1,000 cps, in some cases less than or equal to 750 cps, and in other cases up to 500 cps when measured at 25° C. The viscosity of the composition that contains isocyanate group containing compounds can be any value or can range between any of the values recited above.

In another particular embodiment of the invention, at least some of the isocyanate group containing compounds contain at least two allophanate groups per molecule. The isocyanate group containing compounds that contain at least two allophanate groups per molecule can make up at least 5 wt. %, in some cases at least 10 wt. %, and in other cases at least 20 wt. % and up to 100 wt. %, in some cases up to 75 wt. %, and in other cases up to 50 wt. %, based on the total weight of the isocyanate group containing compounds. The amount of compounds that contain at least two allophanate groups can be any value or range between any of the values recited above.

In one embodiment of the present invention, the NCO content of the isocyanate group containing compounds is 8-25 weight percent, in some cases 10-23 weight percent, in other instances 12-23 weight percent, based on the weight of the isocyanate group containing compounds.

In a particular embodiment of the invention, the isocyanate group containing compounds can be at least 90%, in some cases at least 95%, and in other cases at least 99% aliphatic, based on the weight of the isocyanate group containing compounds.

The isocyanate group containing compounds of the present invention can be prepared by reacting suitable polyisocyanates with suitable hydroxy containing compounds, typically in the presence of an allophanate catalyst.

Any suitable polyisocyanate can be used, suitable polyisocyanates include, but are not limited to organic polyisocyanates, in particular diisocyanates, having aliphatically and/or cycloaliphatically-bound isocyanate groups. Non-limiting examples of such isocyanates include ethylene diisocyanate; 1,4-tetramethylene diisocyanate; 2,2,4-(or 2,4,4)-trimethyl-hexamethylene diisocyanate-(1,6); 1,12-dodecane diisocyanate; lysinediisocyanate-($C_1$-$C_8$-alkyl esters); cyclobutane-1,3-diisocyanate; cyclohexane-1,3- and 1,4-diisocyanate and any mixtures of these isomers; hexahydrotolylene-2,4- and -2,6-diisocyanate and any mixtures of these isomers; hexahydrotolylene-2,4- and -2,6-diisocyanate and any mixtures of these isomers; 3,3'-dimethyl-4,4'-diisocyanato dicyclohexyl methane; 4,4'-diisocyanato dicylohexyl methane and xylylene diisocyanate.

In a particular embodiment of the invention, the polyisocyanates include hexamethylene diisocyanate and 1-isocyanato-3,3,5-trimethyl-5-isocyanato methyl-cyclohexane (isophorone diisocyanate).

Any suitable hydroxy containing compound can be used. Suitable hydroxy compounds include, but are not limited to those according to the structure

where $R^3$ is selected from $C_1$ to $C_{32}$ linear, branched or cyclic aliphatic, cycloaliphatic, aralphatic, or aromatic hydrocarbon group, a —$CH_3$ terminated polyether, a polyester, and a polyurethane.

In a particular embodiment of the invention, the hydroxy containing compound includes n-butanol, t-butanol, 1-propanol, isopropanol, 1-pentanol, 1-hexanol, 1-heptanol, 1-octanol, and combinations thereof.

Any suitable allophanate catalyst can be used in the invention. Suitable catalysts include, but are not limited to metal carboxylates, metal chelates, and tertiary amines. In a particular embodiment of the invention, the catalyst is zinc octoate.

The present invention also provides a two component elastomeric coating composition that includes
a component A that includes the above-described isocyanate group containing compounds; and
a component B that includes a compound containing one or more functional groups that are reactive with isocyanate groups.

As used herein, the term "elastomeric" refers to a coating composition that has a tensile strength (at break) of greater than 1000 psi, % elongation (at break) of greater than 25% and a Die C tear strength of greater than 50 pli. This composition is substantially solvent free so that film thicknesses of greater than 20 mils can be applied, defect free, with little or no change in physical (tensile) properties due to evaporation of volatile compounds.

In an embodiment of the invention, component A is at least 90%, in some cases at least 95%, and in other cases at least 99% aliphatic, based on the weight of component A.

Any suitable compound containing one or more functional groups that are reactive with isocyanate groups can be used in the present invention. Suitable compounds containing one or more functional groups that are reactive with isocyanate groups that can be used in the invention include those that are reactive with the isocyanate groups of component B, and include, but are not limited to polyetherpolyols, polyesterpolyols, hydroxy functional polyurethanes, glycols, glycerine, polyetheramines, polyamines, amine functional polyurethanes, and combinations thereof.

In an embodiment of the invention, the compound containing one or more functional groups that are reactive with isocyanate groups of component B includes an aliphatic primary amine and optionally also includes an aliphatic secondary amine.

In the present invention, the above-described two-component elastomeric coating composition can include, in either or both of component A and component B, one or more additives selected from levelling agents, wetting agents, flow control agents, antiskinning agents, antifoaming agents, fillers, viscosity regulators, thixotropic agents, plasticizers, pigments, dyes, UV absorbers, stabilizers, catalysts, and combinations thereof.

The present two-component elastomeric coating composition is particularly advantageous because of the thermal stability of the allophanate group. Unlike prior art coating systems that include isocyanates containing uretdione structure, the present isocyanates containing allophanate groups are not prone to scission under high temperatures or aging and are not prone to reform monomeric isocyanates and liberate carbon dioxide. Thus the problems in the prior art related to coating integrity, such as blistering and lower tensile strength, are minimized or avoided.

The present invention further provides a process for coating a substrate that includes:
a) providing a surface of a substrate; and
b) contacting the surface with a composition that includes the above-described two component coating composition;

In another embodiment of the present invention, component A can be present in the two component coating composition in an amount of at least 30%, in some cases at least 35%, in some cases at least 40%, and in some instances at least 45% and can be present at up to 70%, in some cases up to 65%, in other cases up to 60% and in some instances up to 55% based on the volume of the two component coating composition. The amount by volume of component A in the two component coating composition can be any value or range between any of the values recited above.

In a further embodiment of the present invention, component B can be present in the two component coating composition in an amount of at least 30%, in some cases at least 35%, in some cases at least 40%, and in some instances at least 45% and can be present at up to 70%, in some cases up to 65%, in other cases up to 60% and in some instances up to 55% based on the volume of the two component coating composition. The amount by volume of component B in the two component coating composition can be any value or range between any of the values recited above.

In an embodiment of the present method, component A can be maintained separate from component B until a time that is less than 6 hours, in some cases less than 4 hours, and in other cases less than 2 hours prior to contacting the composition with the substrate.

In another embodiment of the invention, the two component elastomeric coating composition is contacted with the substrate using an apparatus having a first metering container for receiving component A, a second metering container for receiving component B, and a nozzle in fluid communication with the first and second containers for spraying the composition.

In a particular embodiment, the two component elastomeric coating composition of the present invention can be supplied in the form of a two-pack coating composition. Generally, component B (containing the compound containing one or more functional groups that are reactive with isocyanate groups) and component A, which includes the above-described isocyanate group containing compounds are mixed; typically just prior to application to form a pot mix. The mixing can take place though a conventional mixing nozzle or separately in a container. A layer of the pot mix generally having a thickness in the range of 15 micrometers to 200 micrometers is applied over a substrate, such as an automotive body or an automotive body that has precoated layers, such as electrocoat primer. The foregoing application step can be conventionally accomplished by spraying, electrostatic spraying, roller coating, dipping or brushing the pot mix over the substrate. The layer after application is typically dried to reduce the solvent content from the layer and then cured. Under typical automotive OEM applications, the dried layer of the composition can be cured at elevated temperatures ranging from 60° C. to 160° C. in about 10 to 60 minutes. In some cases, for automotive refinish applications, curing can take place at about ambient to 60° C., and for heavy-duty truck body applications it can take place at about 60° C. to 80° C. The cure under ambient conditions occurs in about 30 minutes to 24 hours, generally in about 30 minutes to 4 hours to form a coating on the substrate having the desired coating properties. It is further understood that the actual curing time can depend upon the thickness of the applied layer, the cure temperature, humidity and on any additional mechanical aids, such as fans, that assist in continuously flowing air over the coated substrate to accelerate the cure rate. It is understood that actual curing temperature would vary depending upon the catalyst and the amount thereof, thickness of the layer being cured and the amount of the crosslinking component utilized.

The substrate in the above-described method can include one or more materials selected from wood, metals, plastic, paper, ceramics, minerals, stone, glass, concrete, and combinations thereof.

In an embodiment of the invention, the suitable substrates for applying the coating composition of the present invention include automobile bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, bicycles, motorcycles, boats, and aircraft. The substrate further includes industrial and commercial new construction and maintenance thereof; cement and wood floors; roofs and walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; and sporting equipment.

In a particular embodiment of the invention, the substrate is a surface of an automotive vehicle. In a more particular embodiment, the substrate is the bed of a truck.

In another embodiment of the invention, the substrate consists of the roof of a structure.

The coatings obtained according to the present invention demonstrate improved stability and do not tend to degrade when exposed to high temperatures and/or aging when compared to prior art coatings. Further, the improved stability and structure of coatings obtained according to the invention demonstrate improved tensile and tear properties when compared to prior art coatings.

The present invention will further be described by reference to the following examples. The following examples are merely illustrative of the invention and are not intended to be limiting. Unless otherwise indicated, all percentages are by weight.

EXAMPLE 1

Hexamethylene diisocyanate (HDI, DESMODUR® H, Bayer Materials Science, LLC, Pittsburgh, Pa.) was charged to a reactor and heated to 105° C. under a nitrogen sparge. At 105° C. a mixture of 67 g n-butanol, 55 g 1-propanol, and 60 g 1-pentanol was fed to the reactor over a 30-minute period. The mix was maintained at 105° C. for 30 minutes and then heated to 115° C. at which time 2.5 g of a 10% zinc octoate solution was added over a 1-hour period. After a 30-minute hold period, the temperature was increased to 120° C. for two hours when 0.27 g p-toluene sulfonic acid was added to the reactor and the product was stripped in TFE at 140° C. at less than 300 mTorr until all volatiles were removed. The 100% solids product had 19.4 wt. % NCO groups and a viscosity of 382 cps at 25° C. at a shear rate of 200 sec$^{-1}$ and 0.08 wt. % HDI monomer. Gel permeation chromatography using polystyrene standards indicated that the HDI allophanate trimer product had a number average molecular weight (Mn) of 740, weight average molecular weight (Mw) of 870 and polydispersity (Mw/Mn) of 1.17.

EXAMPLES 2 AND 3

Polyurethanes were prepared by combining DESMOPHEN® VP LS 2328 (polyester polyol, Bayer Materials Science) and the compound of Example 1 (Example 2) and DESMODUR® N-3400 (prior art, polyisocyanate based on HDI and containing uretdione groups, Bayer Materials Science, Example 3) at a 1:1 NCO:OH equivalent ratio, pouring the mixture into a casting plaque and allowing the composition to fully cure. The compositions were cured at standard conditions of 20° C., 50% relative humidity for at least two weeks before testing. Tensile strength and percent elongation were determined according to ASTM D-412. Split and Die "C" tear strengths were determined according to ASTM D-624. The resulting films had the following properties:

| Example | Tensile Strength | Elongation (%) | Split Tear | Die C Tear |
| --- | --- | --- | --- | --- |
| 2 | 397.4 | 144.4 | 7.7 | 41.2 |
| 3 | 181.8 | 87.1 | 6.5 | 34.6 |
| Improvement | 119% | 66% | 18% | 19% |

The percent improvement values indicate the superior tensile and tear properties of polyurethanes prepared using the isocyanate containing compounds of the present invention.

EXAMPLES 4 AND 5

Polyurethanes were prepared by combining DESMOPHEN® VP LS 2328 (polyester polyol, Bayer Materials Science) and a 50/50 w/w mixture of the compound of Example 1 and DESMODUR® XP-7100N (polyfunctional isocyanate based on HDI, Bayer Materials Science; Example 4) and a 50/50 w/w mixture of DESMODUR® N-3400 and DESMODUR® XP-7100N (prior art, Example 5) at a 1:1 NCO:OH equivalent ratio, pouring the mixture into a casting plaque and allowing the composition to fully cure. The compositions were cured at standard conditions of 20° C., 50% relative humidity for at least two weeks before testing. Tensile strength and percent elongation were determined according to ASTM D-412. Split and Die "C" tear strengths were determined according to ASTM D-624. The resulting films had the following properties:

| Example | Tensile Strength | Elongation (%) | Split Tear | Die C Tear |
| --- | --- | --- | --- | --- |
| 4 | 485.9 | 119.5 | 6.75 | 32.5 |
| 5 | 281.1 | 84.3 | 5.4 | 29.7 |
| Improvement | 72.9% | 41.8% | 25% | 9% |

The percent improvement values indicate the superior tensile and tear properties of polyurethanes prepared using the isocyanate containing compounds of the present invention.

EXAMPLES 6 AND 7

Polyurethanes were prepared by combining DESMOPHEN® VP LS 2249/1 (polyester polyol, Bayer Materials Science) and the compound of Example 1 (Example 6) and DESMODUR® N-3400 (prior art, Example 7) at a 1:1 NCO:OH equivalent ratio, pouring the mixture into a casting plaque and allowing the composition to fully cure. The compositions were cured at standard conditions of 20° C., 50% relative humidity for at least two weeks before testing. Tensile strength and percent elongation were determined according to ASTM D-412. Split and Die "C" tear strengths were determined according to ASTM D-624. The resulting films had the following properties:

| Example | Tensile Strength | Elongation (%) | Split Tear | Die C Tear |
| --- | --- | --- | --- | --- |
| 6 | 2492 | 121 | 185 | 360 |
| 7 | 1035 | 131 | 41 | 84 |
| Improvement | 141% | −8% | 352% | 326% |

The percent improvement values indicate the superior tensile and tear properties of polyurethanes prepared using the isocyanate containing compounds of the present invention.

EXAMPLES 8 AND 9

Polyurethanes were prepared by combining DESMOPHEN® VP LS 2249/1 and a 50/50 w/w mixture of the compound of Example 1 and DESMODUR® XP-7100N (Example 8) and a 50/50 w/w mixture of DESMODUR® N-3400 and DESMODUR® XP-7100N (prior art, Example 9) at a 1:1 NCO:OH equivalent ratio, pouring the mixture into a casting plaque and allowing the composition to fully cure. The compositions were cured at standard conditions of 20° C., 50% relative humidity for at least two weeks before testing. Tensile strength and percent elongation were determined according to ASTM D-412. Split and Die "C" tear strengths were determined according to ASTM D-624. The resulting films had the following properties:

| Example | Tensile Strength | Elongation (%) | Split Tear | Die C Tear |
| --- | --- | --- | --- | --- |
| 8 | 2969 | 73 | 228 | 706 |
| 9 | 2706 | 95 | 172 | 435 |
| Improvement | 10% | −23% | 33% | 62% |

The percent improvement values indicate the superior tensile and tear properties of polyurethanes prepared using the isocyanate containing compounds of the present invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two component elastomeric coating composition that includes
   a component A comprising isocyanate group containing compounds containing
   i) a mean NCO functionality less than or equal to 3.5; and
   ii) from 1.5 to 8 percent by weight, based on the isocyanate containing compound, of allophanate groups; and
   iii) one or more structural units conforming to the following formula

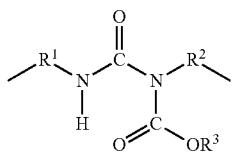

wherein
R¹ is selected from the group consisting of a divalent aliphatic hydrocarbon group having from 4 to 18 carbon atoms, wherein R¹ can optionally include from 1 to 3 NCO groups;
R² is selected from the group consisting of a divalent aliphatic hydrocarbon group having from 4 to 18 carbon atoms, wherein R² can optionally include from 1 to 3 NCO groups; and
R³ is selected from the group consisting of a $C_2$ to $C_{32}$ linear or branched hydrocarbon group, a —CH3 terminated polyether, a polyester, and a polyurethane;
wherein component A is substantially free of uretdione groups and is at least 90% aliphatic, based on the weight of component A; and
a component B comprising a compound containing one or more functional groups that are reactive with isocyanate groups.

2. The composition according to claim 1, wherein the isocyanate group containing compounds of component A have a bulk viscosity of less than or equal to 750 cps at 25° C.

3. The composition according to claim 1, wherein R¹ is a divalent aliphatic hydrocarbon group having from 4 to 12 carbon atoms, R² is a divalent aliphatic hydrocarbon group having from 4 to 12 carbon atoms, and R³ is a $C_1$ -$C_{12}$ linear or branched aliphatic hydrocarbon.

4. The composition according to claim 1, wherein at least some of the isocyanate group containing compounds of component A contain at least two allophanate groups per molecule.

5. The composition according to claim 1, wherein the compound containing one or more functional groups that are reactive with isocyanate groups of component B is selected from the group consisting of polyetherpolyols, polyesterpolyols, hydroxy functional polyurethanes, glycols, glycerine, polyetheramines, polyamines, amine functional polyurethanes, and combinations thereof.

6. The composition according to claim 1, wherein the NCO content of the isocyanate group containing compounds is 8-25 weight percent, based on the weight of the isocyanate group containing compounds.

7. A process for coating a substrate comprising:
a) providing a surface of a substrate;
b) contacting the surface with an elastomeric composition of claim 1.

8. The process according to claim 7, wherein the isocyanate group containing compounds of component A have a bulk viscosity of less than or equal to 750 cps at 25° C.

9. The process according to claim 7, wherein R¹ is a divalent aliphatic hydrocarbon group having from 4 to 12 carbon atoms, R² is a divalent aliphatic hydrocarbon group having from 4 to 12 carbon atoms, and R³ is a $C_1$ -$C_{12}$ linear or branched aliphatic hydrocarbon.

10. The process according to claim 7, wherein at least some of the isocyanate group containing compounds of component A contain at least two allophanate groups per molecule.

11. The process according to claim 7 wherein the compound containing one or more functional groups that are reactive with isocyanate groups of component B is selected from the group consisting of polyetherpolyols, polyesterpolyols, hydroxy functional polyurethanes, glycols, glycerine, polyetheramines, polyamines, amine functional polyurethanes, and combinations thereof.

12. The process according to claim 7, wherein the compound containing one or more functional groups that are reactive with isocyanate groups is an aliphatic primary amine optionally also including an aliphatic secondary amine.

13. The process according to claim 7, wherein the substrate comprises one or more materials selected from the group consisting of wood, metals, plastic, paper, ceramics, minerals, stone, glass, and concrete.

14. The process according to claim 7, wherein the substrate is a surface of an automotive vehicle.

15. The process according to claim 7, wherein component A is present in the composition from about 30% to about 70% by volume.

16. The process according to claim 7, wherein component A is maintained separate from component B until a time that is less than 6 hours prior to contacting the composition with the substrate.

17. The process according to claim 14, wherein the composition is contacted with the substrate using an apparatus having a first metering container for receiving component A, a second metering container for receiving component B, and a nozzle in fluid communication with the first and second containers for spraying the composition.

18. The process according to claim 14, wherein the composition, in either or both of component A and component B, comprise one or more additives selected from the group consisting of levelling agents, wetting agents, flow control agents, antiskinning agents, antifoaming agents, fillers, viscosity regulators, thixotropic agents. plasticizers, pigments, dyes, UV absorbers, stabilizers, catalysts, and combinations thereof.

19. The process according to claim 7, wherein the NCO content of the isocyanate group containing compounds is 8-25 weight percent, based on the weight of the isocyanate group containing compounds.

* * * * *